July 19, 1949.
C. L. PAULUS
2,476,320
SELECTIVE FLUID VALVE
Filed Jan. 11, 1945
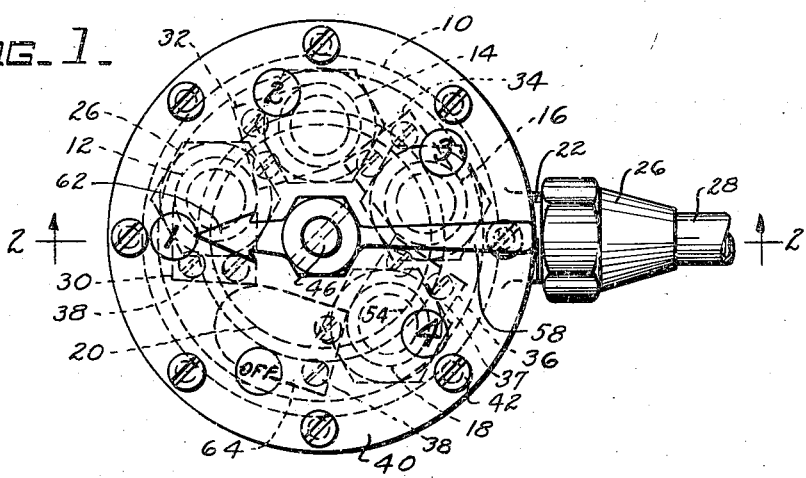
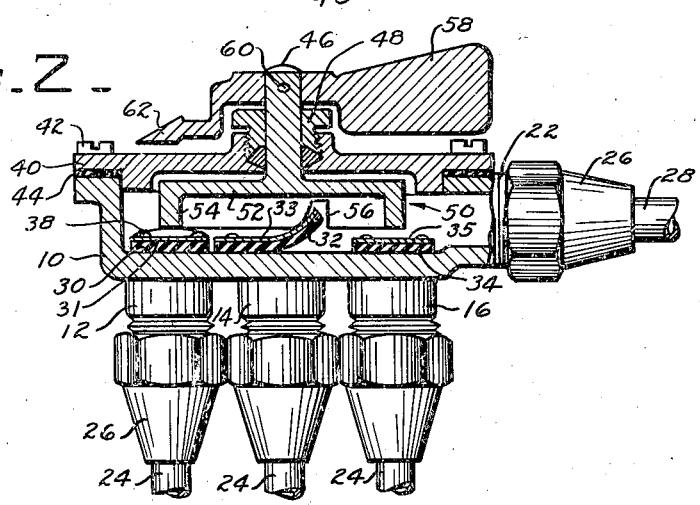
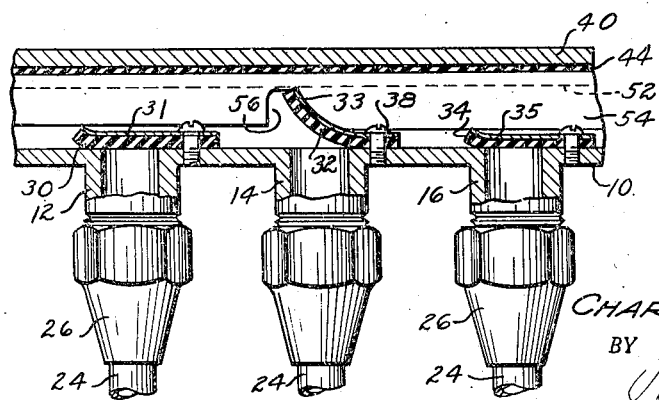
INVENTOR.
CHARLES L. PAULUS
BY
ATTORNEYS Patented July 19, 1949

2,476,320

UNITED STATES PATENT OFFICE 2,476,320

SELECTIVE FLUID VALVE

Charles L. Paulus, Dayton, Ohio

Application January 11, 1945, Serial No. 572,289

3 Claims. (Cl. 277—20)

(Granted under the act of March 3, 1883, as amended April 30, 1928; 370 O. G. 757)

The invention described herein may be manufactured and used by or for Government or governmental purposes, without the payment to me of any royalty thereon.

This invention relates to valves, and especially to a device for connecting a selected one or more of a plurality of inflow passageways to one or more of a plurality of outflow passageways. It is particularly applicable as a selector valve for connecting one after the other of a series of fuel tanks on an aircraft to the fuel pump of the engine, and an embodiment of the invention suitable for use in such a system is therefore shown and described.

Multiple selector valves, as presently employed on aircraft to control the flow of liquid fuel from the several tanks to the engine or engines are provided with metal-to-metal parts which engage to control flow whereby heavy engaging pressure between these parts is required to prevent leakage, so that, if the pressure is great enough to stop leakage, the valve requires too much effort for hand control, and if the pressure is light enough to permit manual operation leakage often occurs.

It is therefore an object of this invention to provide a valve suitable for this purpose which will hold gasoline or the like against leakage, yet be manually operative with very little effort.

Another object is to provide a valve of this kind which is relatively inexpensive to build, light in weight, and which will occupy less space, and have less tendency to develop leakage due to dirt or other foreign matter entering the device from the outside.

Other objects and advantages will be recognized as the invention is further described with reference to the drawings wherein:

Fig. 1 is a top plan view of my invention.

Fig. 2 is a section taken through the device at 2—2 of Fig. 1.

Fig. 3 is a flattened out view taken on a circular line which passes through the centers of inlets 12, 14, and 16.

Like reference characters refer to like parts throughout the drawings.

As an illustrative embodiment of my invention, I have chosen a valve which comprises a housing 10 with four inlet hubs 12, 14, 16, and 18, an "off" position 20 and a single outlet hub 22 but it will be understood that the number of inlets, as well as the number of outlets, may be determined by the requirement of the situation. Tubes 24, attached to the several inlet hubs by nuts 26, bring fluid from the several sources of supply into the housing 10, while tube 28, similarly attached to the outlet hub 22, carries fluid from the housing to the engine or other unit being applied.

The several inlet passageways, which enter the bottom of the housing through hubs 12, 14, 16, and 18, are provided on the inside of the housing with flaps 30, 32, 34, and 36 made of flexible material, preferably oil and gasoline resistant synthetic rubber, bonded to thin sheet-metal spring-tempered pieces 31, 33, 35, and 37 which may preferably be of substantially the same linear dimensions as the flaps and be secured to the bottom of the housing by screws 38 in such position as to lie over and cover the several inlet passageways. The springs are, however, so shaped that, except when they are held down over the openings, their free ends normally curve upward as seen at 32.

The housing cover 40 is fastened to the housing by screws 42, a gasket 44 being interposed between the housing and the cover to seal against leakage. A short shaft 46 is concentrically supported for rotation in the cover 40, and a stuffing box 48 is provided to prevent leakage along the shaft. A cam 50 is carried on the lower end of the shaft 48. Cam 50 consists of a web 52 and a rim 54. A single notch 56 in the rim of the cam allows that flap only with which it is in register to spring upward and open its inlet passageway, the remainder of the inlet passageways, being held shut by their flaps which are in turn held down by the unnotched portion of the rim 54. The upper end of the shaft 46 carries a selector handle 58 held to the shaft by a pin 60. A pointer 62 may be moved to the positions 1, 2, 3 or 4 on the cover, which give visible indication of which flap is in the open position, or to the "off" position on the cover, which indicates that all inflow passageways are closed. The notch 56 thus serves not only to allow the flaps to open, but serves also as a detent for yieldably holding the selector handle in the selected position. For the sake of uniformity, flap 64 may be secured to the bottom of the housing in proper position to cause the pointer 62 to register with the off position. There will, of course, be no inlet passageway under the flaps 64.

*Operation*

The handle is turned until the end 62 points to the number of the inlet passageway which it is desired to open. The notch 56 of the cam 50 is so located, with respect to the handle, that it will then be in position to allow the flap of the desired inlet to spring upward, after which the spring in the notch acts as a yieldable detent to hold the selected position.

While in the illustrative embodiment of the invention shown and described, only one at a time of the inlet passageways are connectible to the outlet passageways, it is obvious that two or more inlet passageways may be connected to the outlet passageway at the same time if two cam notches 56, instead of the one notch shown, are provided.

Having described an embodiment of my invention by which the objects enumerated are attained, I claim:

1. In a fluid valve, a housing, a passageway extending through the wall of said housing, an arcuate flap composed of an actuate layer of sheet synthetic rubber or the like bonded to an arcuate layer of thin spring tempered sheet steel or the like, means for fastening one end of said arcuate flap to said housing adjacent the inner end of said passageway so that the free end will curve upward above and away from said passageway, a cam in said housing operable to one position to flatten said arcuate flap to a plane surface and hold it against the inner end of said passageway, and to another position to allow said arcuate flap to curve upward into a notch in said cam to the open position to thereby act as a detent to yieldably hold it in the open position, and means to operate said cam to its several positions.

2. For use in a valve mechanism of the kind which includes a housing having a flow passageway extending through the wall thereof, a valve for controlling said passageway and a cam for opening and closing the valve; an improved valve part which consists of an arcuate flap composed of an arcuate layer of sheet synthetic rubber or the like bonded to an arcuate layer of thin spring tempered sheet steel or the like, with means adapted for fastening one end of said arcuate flap to a housing adjacent the inner end of a flow passageway so that the free end will curve upward above and away from said flow passageway to a valve open position, said flap being thereby adapted to be flattened to a plane surface and held against the inner end of said passageway in a valve closed position.

3. The structure defined in claim 2 wherein the arcuate layer of sheet synthetic rubber or the like is bonded to the convex side of the arcuate layer of thin spring tempered sheet steel or the like.

CHARLES L. PAULUS.

REFERENCES CITED

The following references are of record in the file of this patent:

UNITED STATES PATENTS

| Number | Name | Date |
| --- | --- | --- |
| 1,029,726 | Sprado | June 18, 1912 |
| 2,153,029 | Tarris | Apr. 4, 1939 |
| 2,415,466 | Curtis | Feb. 11, 1947 |

FOREIGN PATENTS

| Number | Country | Date |
| --- | --- | --- |
| 511,989 | France | Oct. 2, 1920 |
| 611,167 | France | June 28, 1926 |